United States Patent
Wang et al.

(10) Patent No.: US 11,625,001 B1
(45) Date of Patent: Apr. 11, 2023

(54) OPTICAL SYSTEM FOR GENERATING ARBITRARY-ORDER OPTICAL VORTEX ARRAYS AND FINITE OPTICAL LATTICES WITH DEFECTS

(71) Applicant: Zhejiang University, Hangzhou (CN)

(72) Inventors: Ligang Wang, Hangzhou (CN);
Dadong Liu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/970,290

(22) Filed: Oct. 20, 2022

(51) Int. Cl.
| | |
|---|---|
| *G03H 1/00* | (2006.01) |
| *G02B 27/09* | (2006.01) |
| *G01J 1/04* | (2006.01) |
| *G01J 11/00* | (2006.01) |
| *G21K 1/06* | (2006.01) |
| *G21K 1/04* | (2006.01) |
| *G02B 27/28* | (2006.01) |

(52) U.S. Cl.
CPC .......... *G03H 1/0005* (2013.01); *G01J 1/0411* (2013.01); *G01J 1/0429* (2013.01); *G01J 1/0437* (2013.01); *G01J 11/00* (2013.01); *G02B 27/0927* (2013.01); *G02B 27/286* (2013.01); *G21K 1/04* (2013.01); *G21K 1/06* (2013.01); *G03H 2001/0077* (2013.01); *G03H 2225/34* (2013.01)

(58) Field of Classification Search
CPC ................... G03H 1/0005; G03H 1/22; G03H 2001/0077; G03H 2225/34; G01J 1/0411; G01J 1/0429; G01J 1/0437; G01J 11/00; G02B 27/0927; G02B 27/286; G21K 1/04; G21K 1/06

USPC ......................................................... 250/251
See application file for complete search history.

(56) References Cited

U.S. PATENT DOCUMENTS

| | | | | |
|---|---|---|---|---|
| 7,981,774 B2* | 7/2011 | Grier | ...................... | B82Y 20/00 438/479 |
| 2006/0131494 A1* | 6/2006 | Grier | .................... | G03H 1/2249 250/251 |

FOREIGN PATENT DOCUMENTS

| | | |
|---|---|---|
| CN | 105527028 A | 4/2016 |
| CN | 107894288 A | 4/2018 |
| CN | 109612592 A | 4/2019 |
| CN | 110727047 A | 1/2020 |

* cited by examiner

*Primary Examiner* — Kiet T Nguyen
(74) *Attorney, Agent, or Firm* — Nitin Kaushik

(57) ABSTRACT

The invention discloses an optical system for generating arbitrary-order optical vortex arrays and finite optical lattices with defects, comprising a laser, a collimating and beam-expanding system, a spatial light modulator, a 4-f lens system, and an image detector which are disposed according to a light path. After passing through the collimating and beam-expanding system, the linearly-polarized Gaussian beam emitted by the laser is radiated to the spatial light modulator to be modulated in complex amplitude; the first-order diffraction beam of the emergent light generates an arbitrary-order alternating optical vortex array on the back focal plane of the first 2-f lens system, and an adjustable finite optical lattice with defects on the back focal plane of the second 2-f lens system. The topological charge value of each vortex and the spacing between vortices, in the generated arbitrary-order alternating optical vortex array, can be precisely controlled.

10 Claims, 4 Drawing Sheets

OPTICAL SYSTEM FOR GENERATING ARBITRARY-ORDER OPTICAL VORTEX ARRAYS AND FINITE OPTICAL LATTICES WITH DEFECTS

CROSS-REFERENCE TO RELATED APPLICATIONS

The application claims priority to Chinese patent application No. 202111299376.3, filed on Nov. 4, 2021, the entire contents of which are incorporated herein by reference.

TECHNICAL FIELD

The invention relates to the field of optical technology, and particularly to an optical system for generating arbitrary-order alternating optical vortex arrays and adjustable finite optical lattices with defects.

BACKGROUND

An optical vortex has a phase singularity, where the phase is uncertain, and its amplitude and intensity are zero, forming an intensity distribution with a dark hollow structure. The existence of a spiral phase term $\exp(il\varphi)$ in the phase of a vortex optical field indicates that each photon carries an orbital angular momentum of $l\hbar$, where l is the topological charge of the optical vortex, $\varphi$ is the azimuthal angle, and h is the reduced Planck constant. The characteristics of an optical vortex having a dark hollow structure and an orbital angular momentum can be applied in fields such as information transmission, image processing, optical micromanipulation, and the like.

An optical vortex array is an array structure composed of multiple optical vortices, which is arranged according to a certain mathematical structure. Compared with a single optical vortex, the optical vortex array increases the freedom of spatial arrangement and enhances its information encoding ability in the field of information transmission. In the field of optical micromanipulation, it can meet the requirements of simultaneously capturing, manipulating, and observing multiple particles, and thus has gradually become a new research hotspot. There are many methods to generate optical vortex arrays, common ones of which include the multi-beam interference method, spiral phase filtering method, Dammann grating method, spatial light modulation method, and the like. The multi-beam interference method can produce optical vortex arrays with various structures, but interferometers used in experiments need accurate position adjustment, with high difficulty of experiments. The spiral phase filtering method can generate optical vortex arrays with arbitrary shapes and arrays, but spiral phase plates in experiments are difficult to manufacture. The Dammann grating method can only generate optical vortex arrays with square structures, and the position of each optical vortex is limited by diffraction rules. The spatial light modulation method has relatively simple principles. Firstly, the hologram of an optical vortex array is designed, the hologram is then loaded onto a spatial light modulator, and finally, a target optical vortex array can be obtained by adjusting an experimental light path. Moreover, by changing the hologram loaded in real time onto the spatial light modulator, the generated optical vortex array can be flexibly regulated and controlled. In comparison, the spatial light modulation method is a simple method to generate optical vortex arrays.

Spatial light modulators area device that can be used to modulate the amplitude and phase of an optical field. Most of the existing spatial light modulators can only singly modulate the amplitude or phase of a light wave. It is difficult to realize simultaneous and independent modulation of amplitude and phase (that is, complex amplitude modulation). Currently, the complex amplitude encoding of a hologram loaded on the spatial light modulator is a method to effectively realize the complex amplitude modulation, wherein, there are two complex amplitude encoding methods. One is the grating method, which encodes amplitude information into phase information and then reconstructs complex amplitude information through filtering [Applied Optics 38, 5004-5013 (1999)]. The other is the two-phase encoding method, which decomposes one complex amplitude into the superposition of two-phase components with the same modulus [Applied Optics 17, 3874-3883 (1978)].

SUMMARY

The invention uses the spatial light modulation method to generate an arbitrary-order alternating optical vortex array. In order to realize the complex amplitude modulation of an optical field by a spatial light modulator, the invention uses the grating method to perform the complex amplitude encoding of the hologram of an optical vortex array. The invention generates an arbitrary-order alternating optical vortex array, in the array, the optical vortex topological charge value alternately is switched between positive value and negative value and the spacing between optical vortices can be precisely regulated and controlled, and a controllable finite optical lattice with defects can be obtained through a simple experimental light path, which has a very important application prospect in microparticle manipulation.

The purposes of the invention are realized by the following technical solution: An optical system for generating arbitrary-order alternating optical vortex arrays and finite optical lattices with defects, comprises a laser, a collimating and beam-expanding system, a spatial light modulator, a 4-f lens system, and an image detector which are disposed according to a light path; the spatial light modulator can load holograms of different arbitrary-order alternating optical vortex arrays.

Let the optical field of an arbitrary-order alternating optical vortex array in an initial plane be as follows:

$$E(u, v) = G \exp\left(-\frac{u^2 + v^2}{w_0^2}\right)\phi(u, v) \quad (1)$$

where (u, v) represents the Cartesian coordinate system, u represents the horizontal ordinate, and v represents the longitudinal coordinate; $w_0$ is the waist radius of an incident Gaussian beam, and G is the normalization factor of light intensity; $\Phi(u, v)$ represents the initial modulation amplitude and phase distribution of the loaded arbitrary-order alternating optical vortex arrays, whose expression is as follows:

$$\Phi(u,v)=[\cos(au)+i\sin(bv)]^n \quad (2)$$

where a and b are parameters for regulating and controlling the amplitude and phase of optical fields in u and v directions in the arbitrary-order alternating optical vortex arrays, which are real numbers; i represents an imaginary unit; n is a positive integer, representing the absolute value of the positive or negative topological charge value of each optical vortex in the arbitrary-order alternating optical vortex arrays, and herein the alternating optical vortices refer to an alternating arrangement of optical vortices with the topological charge value of ±n.

Since Formula (2) is not in the form of pure phase, the amplitude and phase information in Formula (2) via its spatial frequency spectra can be simultaneously encoded into pure phase information to obtain pure phase holograms, and then the pure phase holograms are loaded onto a phase-only spatial light modulator to realize a complex amplitude modulation.

After passing through the collimating and beam-expanding system, the linearly-polarized Gaussian beam emitted by the laser is radiated to the spatial light modulator to be modulated in complex amplitude; the first-order diffraction beam of the emergent light can be selected on the back focal plane of the first 2-f lens system through a diaphragm to obtain an arbitrary-order alternating optical vortex array. The generated arbitrary-order alternating optical vortex array can form an adjustable finite optical lattice with defects on the back focal plane of the second 2-f lens system.

By adjusting the topological charge value n, the values of the parameters a and b in formula (2), and using the grating method to perform the complex amplitude encoding, different holograms with spatial frequency spectra of arbitrary-order alternating optical vortex arrays can be obtained, and then the different holograms with arbitrary-order alternating optical vortex arrays are loaded on a phase-only spatial light modulator to realize the control of the number of bright spots in the adjustable finite optical lattice or the spacing between the bright spots.

With the value of the parameter a equal to that of the parameter b, a square finite optical lattice array can be generated on the back focal plane of the second 2-f lens system, and without the value of the parameter a equal to that of the parameter b, a diamond finite optical lattice array can be generated on the back focal plane of the second 2-f lens system. When the values of the parameters a and b decrease, the spacing between the bright spots in the adjustable square or diamond finite optical lattice will decrease, and conversely, it will increase.

When the value of the topological charge parameter n is controlled to increase, the number of bright spots in the square or diamond adjustable finite optical arrays will increase. Moreover, at a specific value of n, a finite optical lattice array with defects can be generated.

The collimating and beam-expanding system successively comprises a half-wave plate, a polarized beam splitter, and a beam expander according to the light path setting.

The half-wave plate is fixed on a rotatable optical frame, and the polarization direction of the emergent light can be changed by rotating the half-wave plate around the light propagation direction.

The polarized beam splitter reflects vertical polarization light and transmits horizontal polarization light by a medium beam-splitting film, and the light intensity of the emergent light from the polarized beam splitter can be changed by rotating the half-wave plate.

The beam expander realizes the collimation and beam expansion of the light beam to match the liquid crystal panel of the spatial light modulator.

The phase-only spatial light modulator is connected to a computer, and the holograms of the arbitrary-order alternating optical vortex arrays can be loaded onto the phase-only spatial light modulator through the spatial light modulator control software on the computer.

The beneficial effects of the invention are as follows:

(1) The positive or negative topological charge value (determined by the value of the parameter n) of each vortex and the spacing (determined by the values of the parameters a and b) between vortices, in the generated arbitrary-order alternating optical vortex array, can be precisely controlled. The generated adjustable finite spatial optical lattice with optical defects can be used for the optical manipulation of multiple microparticles and the precise quantum manipulation of light and microparticles such as atoms, molecules, and the like.

(2) There is simplicity in the light path, which saves experimental equipment and space; there is a low requirement for accuracy of the light path, with strong applicability and flexibility.

Wherein, 1. laser; 2. half-wave plate; 3. polarized beam splitter; 4. beam expander: 5. spatial light modulator; 6. first lens; 7. diaphragm; 8. second lens; 9. image detector; 10. computer.

Figure 3:
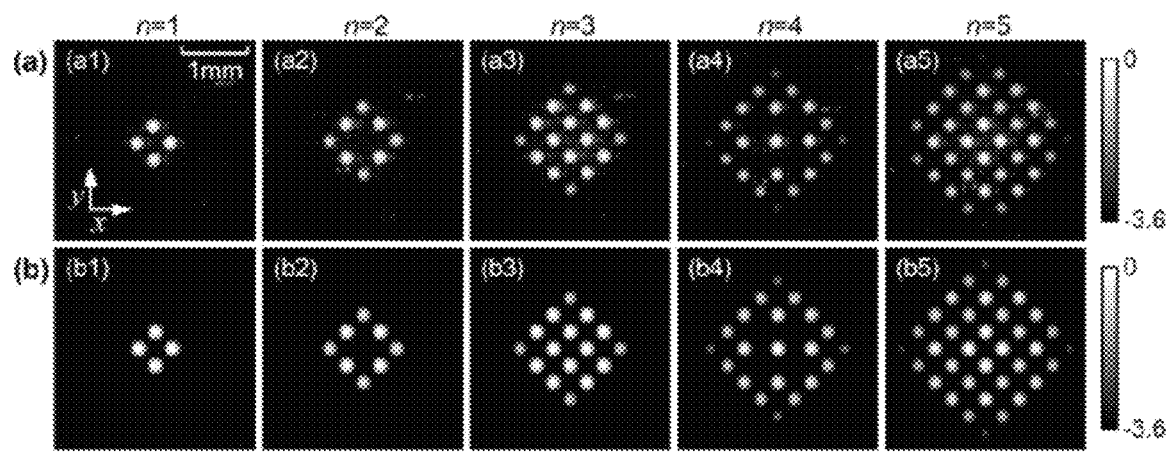

FIG. 3 shows the intensity distributions of the generated square adjustable finite optical lattice (including the intensity distributions of the finite optical lattice with defects). When n is respectively equal to 2 and 4, the generated square finite optical lattices have 1 defect and 4 defects (i.e. missing bright spots) respectively. Herein, the common logarithm of the intensity value is taken. Wherein, FIG. 3(a) shows the experimental diagrams and FIG. 3(b) shows the corresponding theoretical diagrams, the numbers 1 to 5 in FIGS. 3(a) and 3(b) successively represent the cases where the value of the parameter n is equal to 1, 2, 3, 4, and 5, respectively, and other parameters are as follows: both a and b are equal to 5 $mm^{-1}$, and $w_0$ is equal to 1.5 mm.

Figure 4:
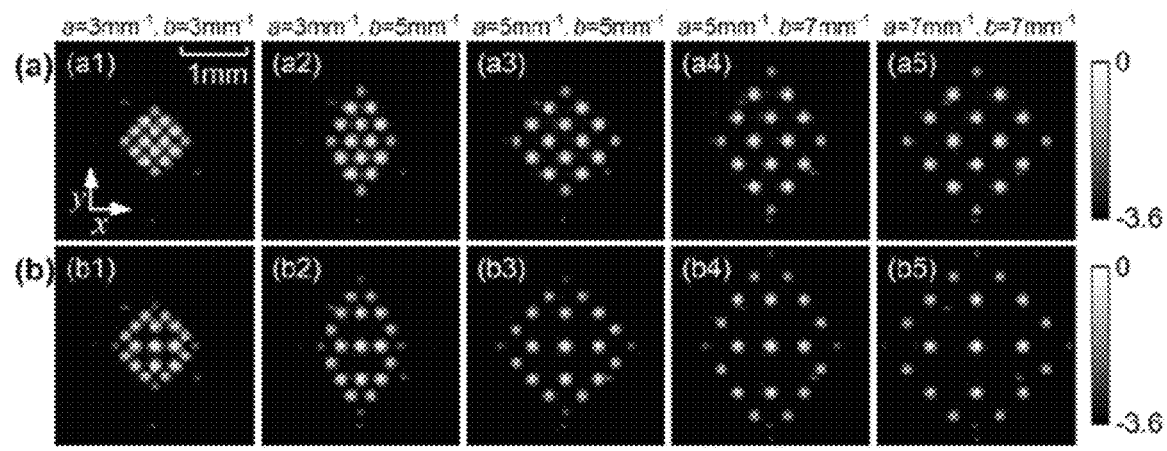

FIG. 4 shows the experimental results of the intensity distributions of the adjustable finite optical lattices generated under different parameters. By controlling the values of the parameters a and b, square or diamond finite optical lattices with controllable spacing can be obtained. Herein, the common logarithm of the intensity value is taken. Wherein, n is equal to 3 in FIG. 4(a), and n is equal to 4 in FIG. 4 (b); the values of the parameters a and b are marked above the images, and the other parameter is as follows: $w_0$ is equal to 1.5 mm.

DETAILED DESCRIPTION OF THE EMBODIMENTS

For the purposes, technical solutions, and advantages of embodiments of the invention to be clearer, the invention will be further described in detail below in combination with the embodiments. It should be understood that the specific embodiments described herein are only for explaining the invention instead of limiting the invention. Modifications or equivalent replacements made by those skilled in the art based on the understanding of the technical solutions of the invention, which do not depart from the spirit and scope of the technical solutions of the invention, should fall within the protection scope of the invention.

Figure 2:
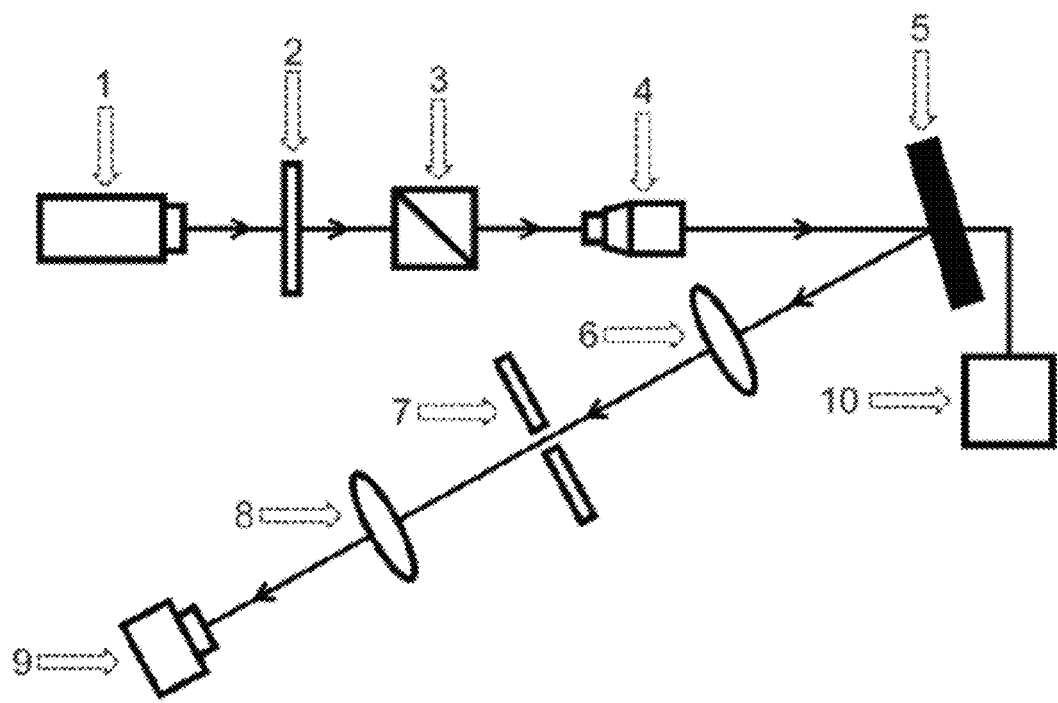
FIG. 2 is the setup diagram for generating an arbitrary-order alternating optical vortex array and an adjustable finite optical lattice with defects.

FIG. 2 is a light path diagram of an embodiment of the invention. There are included successively a laser 1, a half-wave plate 2, a polarized beam splitter 3, a beam expander 4, a spatial light modulator 5, a first lens 6, a diaphragm 7, a second lens 8, an image detector 9, and a computer 10 connected to the spatial light modulator 5, according to the light path setting. Wherein, the distance between the spatial light modulator 5 and the first lens 6 is equal to the distance between the diaphragm 7 and the first lens 6, and is equal to the focal length of the first lens 6: the distance between the diaphragm 7 and the second lens 8 is equal to the distance between the image detector 9 and the second lens 8, and is equal to the focal length of the second lens 8.

The linearly-polarized fundamental-mode Gaussian beam from the laser 1 passes through the corresponding half-wave plate 2 with a wavelength of 632.8 nm, the half-wave plate 2 is fixed on a rotatable optical frame, and the polarization direction of the emergent light can be changed by rotating the half-wave plate 2 around the propagation direction.

After the laser beam emitted through the half-wave plate 2 passes through the polarized beam splitter 3, the transmission light is horizontal polarization light, which satisfies the requirement of the spatial light modulator 5 for the incident light polarization direction. At the same time, the half-wave plate 2 can be rotated to control the light intensity of the emergent light from the polarized beam splitter 3.

The laser beam emitted from the polarized beam splitter 3 will passes through the beam expander 4 to be expanded, so as to match a liquid crystal panel of the spatial light modulator 5, thereby making full use of the modulation performance of the spatial light modulator 5.

The laser beam expanded through the beam expander 4 is incident to the spatial light modulator 5, and a hologram of an arbitrary-order alternating optical vortex array can be loaded onto the spatial light modulator 5 through the computer 10.

After complex amplitude modulation by the spatial light modulator 5, the emergent light is focused on the back focal plane by the first lens 6, and the first-order diffraction beam can be selected through the diaphragm 7 for other-order light to be blocked. The first-order diffraction light is the target arbitrary-order alternating optical vortex array, that is, the plane where the diaphragm 7 is located is the initial plane of the arbitrary-order alternating optical vortex array. The arbitrary-order alternating optical vortex array selected by the diaphragm 7 is focused and imaged on the image detector 9 by the second lens 8. A square or diamond finite optical array can be observed through the image detector 9, and an adjustable finite optical lattice with defects is obtained.

In the following embodiments, the laser 1 is a He—Ne laser with a wavelength of 632.8 nm, and adopts the model HNL050LB laser from Thorlabs Company, US.

The beam expander 4 adopts the GCO-25 series continuous zoom beam expander from Daheng Optics company, whose model is GCO-2501.

The spatial light modulator 5 adopts a phase-only spatial light modulator whose model is PLUTO-2-NIR-015, from Holoeye company, and the modulated light has a waveband of 650 nm to 1100 nm.

The image detector 9 adopts a CMOS camera whose model is E3CMOS20000KMA from ToupTekPhotonics, and the bin size of the camera chip is 13.06 mm×8.76 mm, the pixel size is 2.4 µm×2.4 µm, and the pixel depth is 12 bits.

Both the focal length of the first lens 6 and the focal length of the second lens 8 are 500 mm.

Embodiment 1

The laser 1 emits a linearly-polarized light beam with a wavelength of 632.8 nm. After passing through the half-wave plate 2 and the polarized beam splitter 3, the light has a horizontal polarization direction, and the light intensity of the emergent light from the polarized beam splitter 3 can be adjusted by rotating the half-wave plate 2. The emergent light enters the beam expander 4 along the light propagation direction, the beam expander 4 expands the light beam, and the expanded facula has a diameter of about 3 mm to match the liquid crystal panel of the spatial light modulator 5.

The light beam expanded by the beam expander 4 is radiated to the spatial light modulator 5 which is controlled by the computer 10 to load in real time the hologram with spatial frequency spectra of the arbitrary-order alternating optical vortex array. After modulated in complex amplitude by the spatial light modulator 5 and focused by the first lens 6, the light beam passes through the diaphragm 7 for its first-order diffraction beam to be selected, that is, for the target arbitrary-order alternating optical vortex array to be obtained. The arbitrary-order alternating optical vortex array selected through the diaphragm 7 is focused and imaged on the image detector 9 by the second lens 8, and under the different parameters n, a, and b, the square or diamond finite optical lattices, and the adjustable finite optical lattices with defects are obtained.

Figure 1:
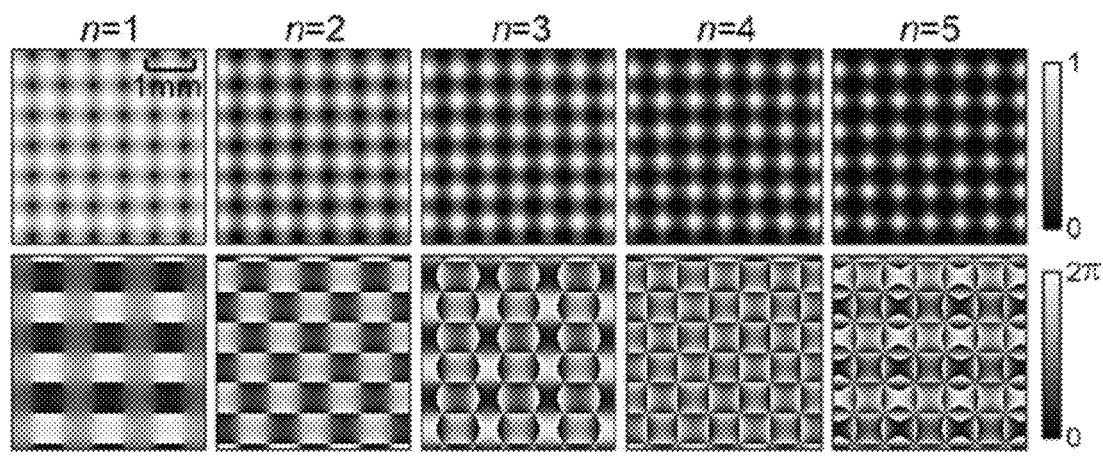
FIG. 1 shows the diagrams of amplitude distributions (upper images) and phase distributions (lower images) with the absolute value n of each alternating optical vortex topological charge value changing from 1 to 5, in an arbitrary-order alternating optical vortex array, where both a and b are equal to 5 $mm^{-1}$.

The spatial light modulator 5 is controlled by the computer 10 to load in real time the holograms with spatial frequency spectra of the arbitrary-order alternating optical vortex arrays. The initial modulation amplitude and phase distribution $\Phi(u, v)$ of the arbitrary-order alternating optical vortex arrays can be expressed as:

$$\Phi(u,v)=[\cos(au)+i\sin(bv)]^n \quad (1)$$

where a and b are parameters for regulating and controlling the amplitude and phase of optical fields in u and v directions in the arbitrary-order alternating optical vortex arrays, which are real numbers; i represents an imaginary unit; n is a positive integer, representing the absolute value of each optical vortex topological charge value of ±n in the arbitrary-order alternating optical vortex arrays. Herein, the alternating optical vortices refer to an alternating arrangement of optical vortices with the topological charge value of ±n. FIG. 1 shows amplitude distribution diagrams (upper images) and phase distribution diagrams (lower images) of the arbitrary-order alternating optical vortex array described by Formula (I), where the topological charge value n changes successively from 1 to 5 from left to right in the images, and the other parameters are as follows: a and b both are equal to 5 mm$^{-1}$.

Since Formula (1) is not in the form of pure phase, the amplitude and phase information in Formula (1) via its spatial frequency spectra can be simultaneously encoded into pure phase information to obtain pure phase holograms, and then the pure phase holograms are loaded onto a phase-only spatial light modulator to realize a complex amplitude modulation.

FIG. 3 shows intensity distribution diagrams of the generated adjustable square finite optical lattices, including intensity distribution diagrams of the adjustable finite optical lattices with defects, with the common logarithm of the light intensity value taken, where FIG. 3(a) shows the experimental diagrams and FIG. 3(b) shows the corresponding theoretical diagrams, and the other parameters are as follows: a and b both are equal to 5 mm$^{-1}$, and $w_0$ is equal to 1.5 mm. As shown in FIG. 3, with the increase in the topological charge value n, the number of the bright spots in the square optical lattice will increase. Furthermore, it can be found from FIGS. 3(a2) and 3(a4) that when the topological charge value n is equal to 2 or 4, there are some of the bright spots missing from the square optical lattice. That is, when the topological charge value n is equal to 2, there is one bright spot missing from the square optical lattice center, and when the topological charge value n is equal to 4, there are four of the bright spots missing from the square optical lattice. In addition to the implemented examples, the use of this solution can also generate other finite optical lattices with different numbers of bright spots and finite optical lattice arrays with defects by changing n.

Embodiment 2

By using the same light path diagram and complex amplitude encoding method as Embodiment 1 and changing the values of the parameters n, a, and b, the obtained holograms are loaded on the spatial light modulator 5 to obtain the adjustable finite optical lattices under different parameters on the image detector 9.

FIG. 4 shows diagrams of intensity distribution experiment results of the adjustable finite optical lattices generated under different parameters, and the common logarithm of the light intensity value is taken, where n is equal to 3 in FIG. 4(a) and n is equal to 4 in FIG. 4(b); the value of the parameter $w_0$ is 1.5 mm. It can be found from FIGS. 4(a1), 4(a3), 4(a5), 4(b1), 4(b3), and 4(b5) that with the value of the parameter a equal to that of the parameter b, a square finite optical lattice array is generated. It can be seen from FIGS. 4(a2), 4(a4), 4(b2), and 4(b4) that without the value of the parameter a equal to that of the parameter b, a diamond finite optical lattice array or diamond finite optical lattice array with defects is formed. By comparing FIGS. 4(a2) and 4(a3), or by comparing FIGS. 4(a4) and 4(a5), or by comparing FIGS. 4(b2) and 4(b3), or by comparing FIGS. 4(b4) and 4(b5), it can be seen that when the value of the parameter a increases, the spacing between the bright spots in the finite optical lattice in the x-direction will increase. By comparing FIGS. 4(a1) and 4(a2), or by comparing FIGS. 4(a3) and 4(a4), or by comparing FIGS. 4(b1) and 4(b2), or by comparing FIGS. 4(b3) and 4(b4), it can be seen that when the value of the parameter b increases, the spacing between the bright spots in the finite optical lattice in the y-direction will increase. Therefore, by changing the values of the parameters a and b, square or diamond spacing-controllable finite optical lattice arrays or optical lattice arrays with defects can be obtained.

The technical means disclosed in the solutions of the invention are not limited to those disclosed in the above technical means, and further comprise the technical solutions consisting of the equivalent substitutions for the above technical features. Matters not mentioned in the invention belong to the common knowledge of those skilled in the art.

What is claimed is:

1. An optical system for generating arbitrary-order optical vortex arrays and finite optical lattices with defects, comprising a laser, a collimating and beam-expanding system, a spatial light modulator, a 4-f lens system, and an image detector which are disposed according to a light path, wherein the spatial light modulator loads holograms of different arbitrary-order alternating optical vortex arrays, and the initial modulation amplitude and phase distribution Φ(u, v) of the loaded arbitrary-order alternating optical vortex arrays is expressed as:

$$\Phi(u,v)=[\cos(au)+i\sin(bv)]^n$$

where (u, v) represents the Cartesian coordinate system, a and b are parameters for regulating and controlling the amplitudes and phases of optical fields in u and v directions in the arbitrary-order alternating optical vortex arrays, which are real numbers; i represents an imaginary unit; n is a positive integer, representing the absolute value of the positive and negative topological charge values of each optical vortex in the arbitrary-order alternating optical vortex arrays, and the alternating optical vortices refer to the alternating arrangement of optical vortices with the topological charge of ±n; and by changing the value of the parameter n, the alternating optical vortex arrays with the topological charge of ±n are controllably generated, and optical lattice arrays with different numbers of bright spots and finite optical lattice arrays with specific optical defects are generated.

2. The optical system for generating arbitrary-order optical vortex arrays and finite optical lattices with defects according to claim 1, wherein the optical field of the arbitrary-order alternating optical vortex arrays in the initial plane is expressed as:

$$E(u, v) = G \exp\left(-\frac{u^2 + v^2}{w_0^2}\right)\phi(u, v)$$

where $w_0$ is the waist radius of an incident Gaussian beam, and G is the normalization factor of light intensity.

3. The optical system for generating arbitrary-order optical vortex arrays and finite optical lattices with defects according to claim 1, wherein in the initial modulation amplitude and phase distribution of the loaded arbitrary-order alternating optical vortex arrays, amplitude information and phase information are simultaneously encoded into pure phase information to obtain pure phase holograms, and then the pure phase holograms are loaded onto a phase-only spatial light modulator to realize a complex amplitude modulation.

4. The optical system for generating arbitrary-order optical vortex arrays and finite optical lattices with defects according to claim 1, wherein a linearly-polarized Gaussian beam emitted by the laser is radiated to the spatial light modulator after passing through the collimating and beam-expanding system; after complex amplitude modulation, the first-order diffraction beam of the emergent light generates an arbitrary-order alternating optical vortex array on the back focal plane of a first 2-f lens system, and an adjustable finite optical lattice with defects on the back focal plane of a second 2-f lens system.

5. The optical system for generating arbitrary-order optical vortex arrays and finite optical lattices with defects according to claim 4, wherein after complex amplitude modulation by the spatial light modulator, the emergent light is focused on a back focal plane by a first lens; the first-order diffraction beam is selected through a diaphragm for other-order light to be blocked, and the first-order diffraction beam is a target arbitrary-order alternating optical vortex array, and the arbitrary-order alternating optical vortex array selected through the diaphragm is focused and imaged on the image detector by a second lens.

6. The optical system for generating arbitrary-order optical vortex arrays and finite optical lattices with defects according to claim 1, wherein the distribution shape of the finite optical lattice can be controlled by changing the values of the parameters a and b.

7. The optical system for generating arbitrary-order optical vortex arrays and finite optical lattices with defects according to claim 6, wherein with the value of the parameter a equal to that of the parameter b, a square finite optical lattice array is generated; and without the value of the parameter a equal to that of the parameter b, a diamond finite optical lattice array or diamond finite optical lattice array with defects is generated.

8. The optical system for generating arbitrary-order optical vortex arrays and finite optical lattices with defects according to claim 6, wherein when the values of the parameters a and b decrease, the spacing between the bright spots in an adjustable finite optical lattice will decrease; and when the values of the parameters a and b increase, the spacing between the bright spots in the adjustable finite optical lattice will increase.

9. The optical system for generating arbitrary-order optical vortex arrays and finite optical lattices with defects according to claim 1, wherein when the value of the parameter n increases, the number of the bright spots in an adjustable finite optical lattice will increase; when the value of the parameter n decreases, the number of the bright spots in the adjustable finite optical lattice will decrease; at a specific value of n, a finite optical lattice array with defects is generated.

10. The optical system for generating arbitrary-order optical vortex arrays and finite optical lattices with defects according to claim 1, wherein the collimating and beam-expanding system successively comprises a half-wave plate, a polarized beam splitter, and a beam expander according to the light path setting;

the half-wave plate is fixed on a rotatable optical frame, and the polarization direction of the emergent light is changed by rotating the half-wave plate around the light propagation direction; the polarized beam splitter is used for reflecting vertical polarization light and transmitting horizontal polarization light, and the light intensity of the emergent light from the polarized beam splitter is changed by rotating the half-wave plate; the beam expander realizes the collimation and beam expansion of the light beam to match a liquid crystal panel of the spatial light modulator; and the laser beam expanded by the beam expander is incident to the spatial light modulator, and the holograms of the arbitrary-order alternating optical vortex arrays are loaded into the spatial light modulator through a computer.

* * * * *